United States Patent
Shibao

(10) Patent No.: US 12,540,250 B2
(45) Date of Patent: Feb. 3, 2026

(54) PRE-PAINTED METAL SHEET, BURN-PREVENTION COVER, AND MANUFACTURING METHOD OF PRE-PAINTED METAL SHEET

(71) Applicant: NIPPON STEEL CORPORATION, Tokyo (JP)

(72) Inventor: Fumio Shibao, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 535 days.

(21) Appl. No.: 17/920,288

(22) PCT Filed: Jul. 9, 2021

(86) PCT No.: PCT/JP2021/025981
§ 371 (c)(1),
(2) Date: Oct. 20, 2022

(87) PCT Pub. No.: WO2022/014498
PCT Pub. Date: Jan. 20, 2022

(65) Prior Publication Data
US 2023/0159768 A1   May 25, 2023

(30) Foreign Application Priority Data

Jul. 15, 2020   (JP) .................... 2020-121225

(51) Int. Cl.
*C09D 7/65*   (2018.01)
*B05D 1/38*   (2006.01)
(Continued)

(52) U.S. Cl.
CPC ................ *C09D 7/65* (2018.01); *B05D 1/38* (2013.01); *B05D 7/14* (2013.01); *B05D 7/24* (2013.01);
(Continued)

(58) Field of Classification Search
CPC ... C09D 5/18; C09D 7/65; C09D 7/63; C09D 7/66; C09D 7/70; C09D 201/00;
(Continued)

(56) References Cited

U.S. PATENT DOCUMENTS

2017/0101545 A1*   4/2017   Hara ....................... B05D 7/16

FOREIGN PATENT DOCUMENTS

| JP | 2005-206736 A | 8/2005 |
|----|---------------|--------|
| JP | 2009-126105 A | 6/2009 |

(Continued)

*Primary Examiner* — Michael E. La Villa
(74) *Attorney, Agent, or Firm* — Birch, Stewart, Kolasch & Birch, LLP

(57) ABSTRACT

A pre-painted metal sheet including a metal sheet and a void-containing paint film, which is located on at least one surface of the metal sheet, with dispersed fine particles and voids, wherein when a cross-section of the void-containing paint film cut in a thickness direction of the void-containing paint film is observed, the voids are present in 40 to 95 area % of a total area of the cross-section of the void-containing paint film. When an average particle diameter of the fine particles is t [μm] and an average film thickness of the void-containing paint film is T [μm], a ratio t/T is in a range of 0.7 to 3.0. An elastic modulus of the fine particles, when compressed by 10% from the thickness direction, is 30 MPa or more.

18 Claims, 2 Drawing Sheets

(51) Int. Cl.
  *B05D 7/00*   (2006.01)
  *B05D 7/14*   (2006.01)
  *B05D 7/24*   (2006.01)
  *B32B 5/14*   (2006.01)
  *B32B 5/16*   (2006.01)
  *B32B 5/30*   (2006.01)
  *B32B 15/08*  (2006.01)
  *B32B 15/16*  (2006.01)
  *B32B 15/18*  (2006.01)
  *C09D 5/18*   (2006.01)
  *C09D 7/40*   (2018.01)
  *C09D 7/63*   (2018.01)
  *C09D 201/00* (2006.01)
  *C08K 7/22*   (2006.01)

(52) U.S. Cl.
  CPC .................. *B05D 7/52* (2013.01); *B32B 5/14* (2013.01); *B32B 5/16* (2013.01); *B32B 5/30* (2013.01); *B32B 15/08* (2013.01); *B32B 15/16* (2013.01); *B32B 15/18* (2013.01); *C09D 5/18* (2013.01); *C09D 7/63* (2018.01); *C09D 7/66* (2018.01); *C09D 7/70* (2018.01); *C09D 201/00* (2013.01); *B05D 2202/00* (2013.01); *B05D 2320/00* (2013.01); *B05D 2601/20* (2013.01); *B05D 2602/00* (2013.01); *C08K 7/22* (2013.01); *Y10T 428/12569* (2015.01); *Y10T 428/12757* (2015.01); *Y10T 428/12799* (2015.01); *Y10T 428/12972* (2015.01); *Y10T 428/12993* (2015.01); *Y10T 428/2495* (2015.01); *Y10T 428/24967* (2015.01); *Y10T 428/26* (2015.01); *Y10T 428/263* (2015.01); *Y10T 428/264* (2015.01); *Y10T 428/265* (2015.01)

(58) Field of Classification Search
  CPC ... B05D 1/38; B05D 7/14; B05D 7/24; B05D 7/52; B05D 2202/00; B05D 2320/00; B05D 2601/20; B05D 2602/00; B32B 15/08; B32B 15/16; B32B 15/18; B32B 5/16; B32B 5/14; B32B 5/30; C08K 7/22; Y10T 428/12569; Y10T 428/12799; Y10T 428/12757; Y10T 428/12972; Y10T 428/12993; Y10T 428/2495; Y10T 428/24967; Y10T 428/263; Y10T 428/264; Y10T 428/265; Y10T 428/26
  See application file for complete search history.

(56) References Cited

FOREIGN PATENT DOCUMENTS

| | | |
|---|---|---|
| JP | 2018-126900 A | 8/2018 |
| WO | WO 2008/078562 A1 | 7/2008 |

\* cited by examiner

PRE-PAINTED METAL SHEET, BURN-PREVENTION COVER, AND MANUFACTURING METHOD OF PRE-PAINTED METAL SHEET

TECHNICAL FIELD

The present invention relates to a pre-painted metal sheet, a burn-prevention cover, and a manufacturing method of the pre-painted metal sheet.

BACKGROUND ART

Conventionally, foam has been formed on a metal sheet surface to reduce weight and cost, and add functionality and design. In particular, foam of a thermoplastic resin generally has excellent flexibility, impact absorbency, a heat-insulating property, and other properties. Therefore, the foam of the thermoplastic resin is widely used, for example, as vehicle interior materials such as ceilings, doors, and instrument panels, and as heat-insulating materials. However, it is difficult to make a foamed metal sheet by combining a metal sheet formed into a complex shape by press molding and foam. The reason for the difficulty is that even if a metal sheet formed into a complex shape is joined to be integrated with foam having increased rigidity by foaming, the foam cannot be neatly aligned with the molded surface of the metal sheet and peeling occurs from a bonding interface, resulting in loss of integrity.

As a technology for solving such difficulties, for example, the following Patent Document 1 discloses a technology for using a paint component in which a foaming agent forms voids during baking and curing of a paint in a paint film of a pre-painted metal sheet.

Further, the following Patent Document 2 discloses a heat foaming pre-painted metal sheet and a manufacturing method thereof, in which a paint film on a surface of a pre-painted metal sheet is foamed and a primer layer is further provided.

PRIOR ART DOCUMENT

Patent Document

Patent Document 1: Japanese Laid-open Patent Publication No. 2005-206736
Patent Document 2: Japanese Laid-open Patent Publication No. 2018-126900

DISCLOSURE OF THE INVENTION

Problems to be Solved by the Invention

However, the pre-painted metal sheet disclosed in the above Patent Document 1 tends to have continuous voids formed by foaming in the paint film, and sufficient paint film adhesiveness cannot be obtained. In particular, when such technology is applied to a pre-painted steel sheet that is processed after film formation, the paint film tends to peel off at the processed portion.

The pre-painted metal sheet disclosed in the above Patent Document 2 uses thermally expandable microcapsules as foaming particles dispersed in the paint, thereby suppressing the presence of continuous voids in the paint film and improving the paint film adhesiveness, which had been a problem. However, pressure that the paint film is subjected to during storage, transportation, and press working destroys the voids in the paint film, resulting in insufficient effectiveness. In particular, the paint film is subjected to high pressure when the pre-painted metal sheet is wound into a coil, which easily destroys the voids. Thus, the paint film with destroyed voids did not provide sufficient performance.

The present invention has been made in view of the above problems, and an object of the present invention is to provide a pre-painted metal sheet and a manufacturing method of the pre-painted metal sheet capable of retaining voids in the paint film even if the paint film is subjected to pressure during storage, transportation, and press working, and a burn-prevention cover using such a pre-painted metal sheet.

Means for Solving the Problems

The inventors have diligently studied to solve the above problems and arrived at the idea of dispersing fine particles with appropriate size in a paint film with voids, and have completed the present invention.

The gist of the invention completed based on such knowledge is as follows.

[1] A pre-painted metal sheet including: a metal sheet; and a void-containing paint film, which is a paint film located on at least one surface of the metal sheet, with dispersed fine particles and voids, wherein when a cross-section of the void-containing paint film cut in a thickness direction of the void-containing paint film is observed, the voids are present in 40 to 95 area % of a total area of the cross-section of the void-containing paint film, when an average particle diameter of the fine particles is t [μm] and an average film thickness of the void-containing paint film is T [μm], a ratio t/T is in a range of 0.7 to 3.0, and an elastic modulus of the fine particles, when compressed by 10% from the thickness direction, is 30 MPa or more.

[2] The pre-painted metal sheet according to [1], wherein the average film thickness T of the void-containing paint film is larger than an average diameter dv of the voids.

[3] The pre-painted metal sheet according to [1] or [2], wherein when the average diameter of the voids is dv [μm], the average film thickness T of the void-containing paint film and the average diameter dv of the voids satisfy a relationship expressed by the following inequality (1).

$$T \geq 1.1 dv \quad (1)$$

[4] The pre-painted metal sheet according to any one of [1] to [3], wherein when a presence ratio of the voids in the void-containing paint film relative to the total area of the cross-section is Pv [area %], the presence ratio Pv [area %] of the voids, the average particle diameter t of the fine particles, the average film thickness T, and a predetermined measurement width W satisfy a relationship expressed by the following inequality (2).

$$(t^2/8)\pi/(W \cdot T) \leq Pv \leq 10 t^2 \pi/(W \cdot T) \quad (2)$$

[5] The pre-painted metal sheet according to any one of [1] to [4], wherein the average film thickness T of the void-containing paint film is in a range of 50 to 1000 μm.

[6] The pre-painted metal sheet according to any one of [1] to [5], wherein a second paint film that does not contain voids and has an average film thickness of 0.5 to 20.0 μm is present on an upper layer of the void-containing paint film.

[7] The pre-painted metal sheet according to any one of [1] to [6], wherein the fine particles are at least either one of polyacrylonitrile or vinylbenzene polymer.

[8] The pre-painted metal sheet according to any one of [1] to [7], wherein a content of the fine particles is in a range of 1 to 40 area % of the total area of the cross-section of the void-containing paint film when cut in the thickness direction of the void-containing paint film.

[9] The pre-painted metal sheet according to any one of [1] to [8], wherein the metal sheet is any of a galvanized steel sheet, a zinc-aluminum alloy-plated steel sheet, a zinc-aluminum-magnesium alloy-plated steel sheet, an aluminum plated steel sheet, a zinc-nickel alloy-plated steel sheet, a zinc-iron alloy-plated steel sheet, a copper sheet, a magnesium sheet, an aluminum sheet, or a stainless sheet

[10] The pre-painted metal sheet according to any one of [1] to [9], wherein an emissivity of a surface of the metal sheet opposite the void-containing paint film is 0.30 or less.

[11] A burn-prevention cover, which is a cover formed by the pre-painted metal sheet according to any one of [1] to [10], wherein a heat source is used to be located on an opposite side of the void-containing paint film.

[12] A manufacturing method of a pre-painted metal sheet having a void-containing paint film, which is a paint film with dispersed fine particles and voids, on at least one surface of a metal sheet, including: forming the void-containing paint film by coating a first paint, which contains the fine particles, a resin, a curing agent, hollow microcapsules, and a solvent, on at least one surface of the metal sheet and heating the metal sheet coated with the first paint to be cured, wherein the hollow microcapsules contain an organic solvent, a content of the hollow microcapsules in the first paint is in a range of 5 to 50 mass % of a solid content mass of the first paint, and when an average particle diameter of the fine particles is t [μm] and an average film thickness of the void-containing paint film after dried and cured is T [μm], the first paint is coated so that a ratio t/T is in a range of 0.7 to 3.0.

[13] The manufacturing method of the pre-painted metal sheet according to [12], wherein an average paint film thickness of the first paint is larger than an average diameter of the hollow microcapsules.

[14] The manufacturing method of the pre-painted metal sheet according to [12] or [13], wherein the average paint film thickness of the first paint is 1.1 times or more the average diameter of the hollow microcapsules.

[15] The manufacturing method of the pre-painted metal sheet according to any one of [12] to [14], wherein the first paint is cured at a temperature in a range of 150 to 250° C. and the hollow microcapsules containing the organic solvent are foamed at a temperature in a range of 130 to 190° C.

[16] The manufacturing method of the pre-painted metal sheet according to any one of [12] to [15], wherein the metal sheet coated with the first paint is heated at a heating rate of 70 to 750° C./min to reach a peak metal temperature of 200 to 250° C., the peak metal temperature is held for 0.5 to 10 s, and then the metal sheet is cooled to 60° C. or less at a cooling rate of 3 to 230° C./min.

[17] The manufacturing method of the pre-painted metal sheet according to any one of [12] to [16], wherein the fine particles are at least either one of polyacrylonitrile or vinylbenzene polymer.

[18] The manufacturing method of the pre-painted metal sheet according to any one of [12] to [17], wherein a multilayer curtain film is formed by the first paint and a second paint that does not contain the hollow microcapsules and coated on a surface of the metal sheet.

Effect of the Invention

As explained above, the present invention makes it possible to provide a pre-painted metal sheet, even a pre-painted metal sheet equipped with a paint film with voids, in which the voids in the paint film are difficult to be destroyed by pressure due to transportation, storage, and processing of the paint film, and having a heat-insulating property, and a burn-prevention cover using such a pre-painted metal sheet.

EMBODIMENTS FOR CARRYING OUT THE INVENTION

Figure 1:
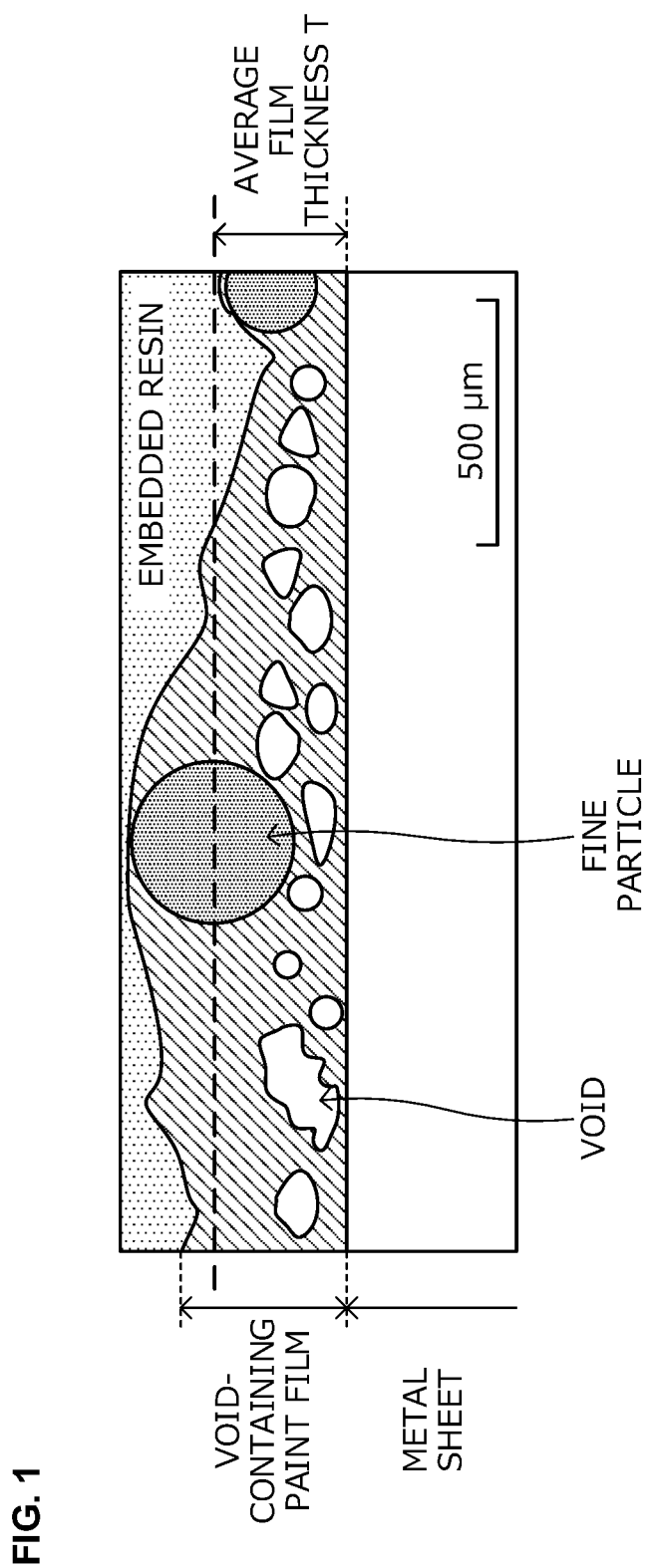
FIG. 1 is a diagram when a cross-section of an example of a void-containing paint film held by a pre-painted metal sheet according to an embodiment of the present invention is observed.

Hereinafter, preferred embodiments of the present invention are explained in detail.
(Pre-Painted Metal Sheet)

A pre-painted metal sheet according to an embodiment of the present invention is a pre-painted metal sheet including: a metal sheet; and a void-containing paint film, which is a paint film located on at least one surface of the metal sheet, with dispersed fine particles P and voids (hereinafter, sometimes abbreviated as a "paint film A"), wherein when a cross-section of the void-containing paint film cut in a thickness direction of the void-containing paint film is observed, the voids are present in 40 to 95 area % of a total area of the cross-section of the void-containing paint film, when an average particle diameter of the fine particles is t [μm] and an average film thickness of the void-containing paint film is T [μm], a ratio t/T is in a range of 0.7 to 3.0, and an elastic modulus of the fine particles P, when compressed by 10% from the thickness direction, is 30 MPa or more.
<Metal Sheet>

Examples of the metal sheets used as base sheets for coating in this embodiment include various steel sheets, nonferrous metal sheets, and the like including alloys, to which various known plating treatments, and the like, are applied as necessary. Such metal sheets include, for example, cold-rolled steel sheets, galvanized steel sheets, zinc-aluminum alloy-plated steel sheets, zinc-aluminum-magnesium alloy-plated steel sheets, aluminum-plated steel sheets, zinc-nickel alloy-plated steel sheets, zinc-iron alloy-plated steel sheets, zinc-vanadium-plated steel sheets, zinc-zirconium-plated steel sheets, aluminum sheets, aluminum alloy sheets, copper sheets, copper alloy sheets, magnesium sheets, magnesium alloy sheets, stainless sheets, and so on.

Here, in the metal sheet of this embodiment, an emissivity of a surface of the metal sheet opposite the void-containing paint film (paint film A), which is described in detail below, is preferably 0.30 or less. By setting the emissivity to 0.30 or less, a temperature rise of the paint film A can be more reliably suppressed when heat is applied to the surface of the metal sheet opposite the paint film A. As a result, the pre-painted metal sheet of this embodiment can be used more suitably as a material for a burn-prevention cover. In the metal sheet, the emissivity of the surface opposite the paint film A is more preferably 0.25 or less. The lower the emissivity of the surface, the better in terms of suppressing the temperature rise mentioned above, and a lower limit value is not specified, but approximately 0.03 is a practical lower limit value.

A thickness of the metal sheet of this embodiment may be set appropriately according to mechanical strength (for example, tensile strength, or other strengths) required for the pre-painted metal sheet of this embodiment.

<Void-Containing Paint Film>

The void-containing paint film (paint film A) of this embodiment is a paint film located on at least one surface of the metal sheet as described above, in which the fine particles P are dispersed and voids are contained. In addition to the above-mentioned fine particles P and voids, the paint film A preferably contains a binder resin composed of, for example, various thermoplastic resins, thermosetting resins, and the like. The paint film A may also contain fine particles other than the fine particles P.

In the paint film A of this embodiment, the binder resin is more preferably composed of the thermosetting resin. By using the thermosetting resin, baking and curing of the paint film and formation of voids can be performed simultaneously. A type of the thermosetting resin is not limited, and various known resins such as a polyester resin, polyurethane resin, acrylic resin, and epoxy resin can be used.

Known curing agents such as melamine resins and isocyanates may be used as curing agents. These resins may be used alone or in combination. For example, methyl-melamine formaldehyde (Cymel 303, manufactured by Nippon Cytec Industries Co., Ltd.), imino group melamine (Cymel 327, manufactured by Nippon Cytec Co., Ltd.), butyl group melamine (Super Beckamine, manufactured by DIC Corporation), and the like can be used as the melamine resins. The melamine resin can also be used together with an acid catalyst (Catalyst 600, manufactured by Nippon Cytec Industries Co., Ltd.), if necessary. For example, block isocyanate (Coronate, manufactured by Tosoh Corporation) or the like can be used as isocyanates. These curing agents and additives may be used alone or in combination.

When the cross-section of the paint film A of this embodiment cut in a thickness direction of the paint film A is observed, the voids are present in 40 to 95 area % of a total area of the cross-section of the paint film A. Here, when the cross-section is observed by using a microscope through the following method, the "void" in this embodiment corresponds to a portion where an embedded resin exists when resin-embedded polishing is performed, and to a depressed portion with respect to a polished surface when microtome processing is performed or Cryo-FIB-SEM is used.

In the following, a percentage of the voids to the total area of the cross-section is also referred to as a presence ratio Pv [area %]. When the presence ratio Pv of such voids is less than 40 area %, it is difficult to provide a heat-insulating property to the paint film A. By setting the presence ratio Pv of the voids to 40 area % or more, it is possible to provide the heat-insulating property to the paint film A. The presence ratio Pv of the voids is preferably 50 area % or more. On the other hand, when the presence ratio Pv of the voids exceeds 95 area %, adhesiveness of the paint film A may decrease and the paint film may peel off from the metal sheet. The presence ratio Pv of the voids is preferably 85 area % or less.

Here, the presence ratio Pv of the voids can be measured as follows. That is, the pre-painted metal sheet is polished and a flat cross-section formed by the polishing is observed under a microscope. The voids in the paint film can be easily distinguished because of their different focal points. A microscope image is binarized and a void area is determined by image processing. The void area % changes with each polishing cycle and eventually reaches a maximum value. This maximum value is taken as the void area %. An average of the area % of the voids at 10 arbitrarily selected locations is used as a percentage of the voids. Note that when the void area of the first observed cross-section is the maximum value, it is excluded from the average value determination.

A polishing method is not limited, and known methods can be employed, such as the resin-embedded polishing and the microtome processing, for example. For particularly high precision, Cryo-FIB-SEM (Cryo scanning electrons-copy combined with focused ion beam) can be suitably used as the polishing method. Since a sample temperature is set at about −100° C. and the sample is processed by an ion beam, there is little damage to the paint film due to heat generated by ion beam irradiation, and polishing on a sub-nanometer scale is possible.

In this embodiment, such "voids" are contained inside the paint film A. When an average film thickness of the paint film A described below is T [μm] and an average diameter of the voids is dv [μm], a relationship T>dv is established. Furthermore, in this embodiment, the average film thickness T of the paint film A and the average diameter dv of the voids preferably satisfy a relationship expressed by the following inequality (1). By satisfying the relationship expressed by the following inequality (1), it is possible to further improve paint film adhesiveness after processing.

$$T \geq 1.1 dv \qquad (1)$$

The average film thickness T of the paint film A and the average diameter dv of the voids more preferably satisfy a relationship of $T \geq 1.4$ dv. An upper limit value of a ratio (the average film thickness T of the paint film A/the average diameter dv of the voids) is not specified, but in terms of efficiently obtaining desired burn-prevention properties, an upper limit of the ratio (the average film thickness T of the paint film A/the average diameter dv of the voids) is substantially about 3.0.

Here, the average diameter dv of the voids can be measured as follows. That is, an average area ratio Pv' per void is obtained regarding the voids that were binarized when determining the void presence ratio Pv. Here, continuous voids are counted as one void. Then, the average diameter dv of the voids is calculated using the following formula.

$$dv = (4 \cdot Pv'/\pi)^{0.5}$$

The fine particles P are dispersed inside the paint film A as described above. By providing the fine particles P inside the paint film A, stress concentration in the paint film A can be dispersed and collapse of the voids can be suppressed even if the paint film A is subjected to pressure. Such fine particles P are preferably made of polyacrylonitrile or vinylbenzene polymer, or both. Other possible candidates for the fine particles P include, for example, those made of various nitrides, such as titanium nitride and boron nitride, and various metals, such as stainless steel. However, because of their high specific gravity, these nitrides and metals tend to make sediment in the paint used to form the paint film A, and the nitrides and metals may not be dispersed in the paint film A to be formed. It is also possible to consider using nylon polymer, acrylic polymer, urethane polymer, or fluoropolymer as the material for the fine particles P. However, these materials are undesirable because they are deformed by a surface pressure caused by coiling tension of a coil. For these reasons, it is preferable to use polyacrylonitrile or vinylbenzene polymer with low specific gravity as the material for the fine particles P.

The average particle diameter t of the fine particles P is set so that the ratio t/T to the average film thickness T of the paint film A is 0.7 to 3.0, as detailed below. By setting the average particle diameter t of the fine particles P so that the above relationship is satisfied, it is possible to retain the voids even if the paint film A is under pressure. The average particle diameter t of the fine particles P is more preferably a value such that the ratio t/T is in a range of 0.8 to 2.0. Even if the ratio t/T of the fine particles P to the average film thickness T of the paint film A is in the above range, the paint film A exists above the fine particles P, and the fine particles P do not protrude from a surface of the paint film A.

Here, the average particle diameter t of the fine particles P can be measured as follows. That is, the pre-painted metal sheet is polished, and a flat cross-section formed by polishing is observed under a microscope to determine a cross-sectional diameter of the fine particles P. The cross-sectional diameter changes with each repetition of polishing and eventually reaches a maximum value. This maximum value is taken as the particle diameter of the fine particles P. An average of the particle diameters of the fine particles P at 10 arbitrarily selected locations is the average particle diameter t of the fine particles P. Note that when the first cross-sectional diameter observed is the maximum value, it is excluded from the average determination because it may be smaller than an actual particle diameter.

The polishing method is not limited and known methods can be employed, such as the resin-embedded polishing and the microtome processing, for example. For particularly high precision, Cryo-FIB-SEM is the preferred polishing method. Since the sample temperature is set at about −100° C. and the sample is processed by the ion beam, there is little damage to the paint film due to heat generated by the ion beam irradiation, and polishing on a sub-nanometer scale is possible. An example of a microscope image of the flat cross-section obtained by the above method is presented in FIG. 1.

Furthermore, in this embodiment, the presence ratio Pv [area %] of the voids and the average particle diameter t of the fine particles P preferably satisfy a relationship expressed by the following inequality (2). By satisfying the relationship expressed by the following inequality (2), it is possible to further keep the heat-insulating properties and retain the voids in the paint film.

$$(t^2/8)\pi \leq Pv \leq 10t^2\pi \quad (2)$$

The presence ratio Pv [area %] of the voids and the average particle diameter t of the fine particles P preferably satisfy a relationship expressed by the following inequality (2)'.

$$(t^2/4)\pi \leq Pv \leq 6t^2\pi \quad (2)'$$

A content of the fine particles P in the paint film A is preferably in a range of 1 to 40 area % of a total area of the cross-section of the paint film A when the paint film A is cut in the thickness direction. By setting the content of the fine particles P in the above range, it is possible to properly disperse the fine particles P in the paint film A. The content of the fine particles P is more preferably in a range of 2 to 30 area %.

Here, the content of the fine particles P in the already formed paint film A can be measured as follows. That is, an area S of an entire paint film A and the number of fine particles P, $N_P$, are determined by any cross-sectional observation image in the thickness direction as described above. The content of the fine particles P, Cp, can be obtained by the following formula.

$$Cp=\{N_P \times \pi \times (t/2)^2\}/S$$

In the pre-painted metal sheet of this embodiment, when the average film thickness of the paint film A is T [μm], the ratio t/T of the average particle diameter t of the fine particles P to the average film thickness T of the paint film A is set in the range of 0.7 to 3.0. When the ratio t/T is less than 0.7, the pressure applied to the paint film A cannot be kept by the fine particles P, and the voids may be destroyed. The ratio t/T is preferably 0.8 or more. On the other hand, when the ratio t/T exceeds 3.0, the fine particles P may drop out of the paint film A. The ratio t/T is preferably 2.5 or less and more preferably 2.0 or less.

Here, in this embodiment, the average film thickness T of the paint film A is preferably, for example, in a range of 50 μm or more and 1000 μm or less. By setting the average film thickness T to 50 μm or more, more sufficient heat-insulating performance can be obtained. The average film thickness T of the paint film A is more preferably 70 μm or more. On the other hand, by setting the average film thickness T of the paint film A to 1000 μm or less, a decrease in process adhesiveness of the paint film A can be suppressed more certainly. The average film thickness T of the paint film A is more preferably 700 μm or less.

The average film thickness T of the paint film A can be measured as follows. A vertical cross-section of the pre-painted metal sheet (a cross-section parallel to the thickness direction of the pre-painted metal sheet) is observed under a microscope. Then, a maximum thickness in an area where there is no fine particle P (that is, an area where a surface of the paint film is approximately parallel to a surface of the metal sheet) is determined. Ten views are arbitrarily observed, and the average (arithmetic mean) of the ten observations is taken as the average film thickness T.

In the pre-painted metal sheet of this embodiment, when the fine particles P are compressed by 10% (more precisely, when the fine particles P are compressed from the thickness direction of the paint film A by 10%), an elastic modulus is 30 MPa or more. When the elastic modulus of the fine particles P at 10% compression is less than 30 MPa, the fine particles P may not be able to keep the pressure applied to the paint film A, and the voids may be destroyed. An upper limit of the elastic modulus of the fine particles P at 10% compression is not limited but is substantially approximately 100 MPa.

Here, the elastic modulus at 10% compression of the fine particles P can be measured as follows. The pre-painted metal sheet is embedded in resin and polished. Then, a nanoindenter (TI premier multi scale, manufactured by Bruker Corporation) is used to apply a force in a compression direction to the fine particles from the vertical cross-section (a cross-section parallel to the thickness direction of the pre-painted metal sheet) to investigate a relationship between displacement and load. The elastic modulus can be obtained from the load at which the displacement of the fine particles P becomes 1/10 of the average particle diameter t of the fine particles P. When the fine particles P are destroyed before 10% compression, a maximum load is determined and used as the elastic modulus.

The void-containing paint film (paint film A) of this embodiment has been described in detail above.

<Second Paint Film>

In the pre-painted metal sheet of this embodiment, it is preferable to further form a second paint film that does not contain voids (hereinafter sometimes abbreviated as a "paint film B") on an upper layer of the above-mentioned void-containing paint film (paint film A). The presence of the second paint film (paint film B) that does not contain voids improves the process adhesiveness of the pre-painted metal sheet.

Here, various known thermoplastic and thermosetting resins can be used for a resin forming the paint film B. However, the same type of resin as the binder resin forming the paint film A is preferably used and the same resin as the binder resin forming the paint film A is more preferably used in consideration of adhesiveness with the paint film A.

An average film thickness of the paint film B is preferably in a range of 0.5 to 20.0 µm. By setting the average film thickness of the paint film B to 0.5 µm or more, it is possible to uniformly cover the paint film A without creating uncoated areas. The average film thickness of the paint film B is more preferably 1.0 µm or more. On the other hand, by reducing the average film thickness of the paint film B to 20.0 µm or less, it is possible to control an increase in cost. In addition, when attempting to increase the average film thickness, popping, which is a coating defect caused by solvent bumping in a paint, may occur. It is necessary to reduce a sheet-passage rate and increase a heating rate to suppress popping, but such measures will result in a decrease in productivity. However, it is possible to prevent the occurrence of popping without causing the decrease in productivity by setting the average film thickness of the paint film B to 20.0 µm or less. The average film thickness of the paint film B is more preferably less than 15.0 µm.

The average film thickness of the paint film B can be measured in the same way as the average film thickness of the paint film A.

In the pre-painted metal sheet of this embodiment, various known additives may be contained in the paint film A and paint film B to an extent that the above effects are not impaired.

For example, various color pigments may be dispersed in the paint films A and B, if necessary. As such color pigments, known pigments can be used. For example, carbon black (furnace black, Ketjen black, acetylene black, channel black), red iron oxide, aluminum, mica, titanium oxide, and the like can be used as color pigments.

In the pre-painted metal sheet of this embodiment, a chemical treatment layer and/or a primer layer may be provided between the metal sheet and the paint film A. By providing the chemical treatment layer and/or the primer layer, adhesiveness between the metal sheet and the paint film A can be improved and corrosion resistance of the pre-painted metal sheet can be enhanced. Various known products can be used for such chemical treatment layer and primer layer.

Hereinabove, the pre-painted metal sheet of this embodiment has been described in detail.

(Manufacturing Method of Pre-Painted Metal Sheet)

Next, a manufacturing method of the pre-painted metal sheet of this embodiment will be described in detail.

The manufacturing method of the pre-painted metal sheet of this embodiment is a manufacturing method of a pre-painted metal sheet having a void-coating paint film (paint film A), which is a paint film with dispersed fine particles and voids, on at least one surface of the metal sheet.

More precisely, in the manufacturing method of the pre-painted metal sheet of this embodiment, a first paint containing fine particles P, a resin, a curing agent, hollow microcapsules, and a solvent is coated on at least one surface of the metal sheet. The metal sheet coated with the first paint is then heated to cure the first paint to form the void-containing paint film (paint film A). Here, the hollow microcapsules contain an organic solvent.

Here, the fine particles P used in the first paint have been mentioned earlier. The resin and curing agent used in the first paint are preferably the above-mentioned resin and curing agent for producing the binder resin of the paint film A.

Furthermore, the solvent used for the first paint is not limited and various known solvents such as pure water and organic solvents can be used, as long as the solvent can properly disperse the fine particles P, resin, curing agent, and hollow microcapsules.

The hollow microcapsules used in the first paint should consist of a liquid that gasifies (more precisely, an organic solvent) and a capsule wall that encapsulates the liquid, and expand upon heating as the liquid gasifies and the capsule wall softens. In such hollow microcapsules, the organic solvent inside the capsule gasifies and expands during the curing process of the first paint. In parallel with such expansion, the paint film cures to form voids. The organic solvent gas or atmospheric gas components may remain inside the voids formed in this manner, or organic solvent or other substances may remain in a liquid state to an extent that they are not observed in the cross-sectional observation as described above. Various types of known thermal expansion microcapsules may be used. Examples of such thermal expansion microcapsules include Advancell (registered trademark) series manufactured by Sekisui Chemical Co., Ltd., Matsumoto Microsphere (registered trademark) series manufactured by Matsumoto Yushi-Seiyaku Co., Ltd., Expancell (registered trademark) series manufactured by Japan Fillite Co., Ltd, and the like, for example. These may be used alone or in a combination of two or more types. An average particle diameter of the hollow microcapsules is not limited, but in consideration of coating properties and volume after heating, for example, the particle diameter in a range of 15 to 30 µm is preferable. An average paint film thickness of the first paint is preferably larger than an average diameter of the hollow microcapsules to more reliably enable the relationship between the average film thickness T of the paint film A and the average diameter dv of the voids (T>dv) as described above.

A content of the hollow microcapsules in the first paint is in a range of 5 to 50 mass %, considering a percentage of the voids in the paint film A to be formed. By setting the content of the hollow microcapsules in the above range, the percentage of the voids (presence ratio Pv) in the paint film A to be formed can be more reliably set to 45 to 95 area %. The content of the hollow microcapsules is preferably in a range of 10 to 40 mass %.

A content of the fine particles P in the first paint is preferably in a range of 1 to 40 area % in an area ratio when coated. By setting the content of the fine particles P in the above range, a dispersion state of the fine particles P can be more reliably set to a desired state. The content of the fine particles P is more preferably in a range of 3 to 30 area %.

A method of coating the first paint is not limited, and various known methods such as, for example, a roll coating method, a curtain coating method, and a spraying method can be used. Using these methods, the first paint should be coated in an adhesion amount such that the average film thickness after dried and cured is in the above range. Among these methods, the curtain coating method is particularly preferred because it allows uniform coating.

A heating temperature for drying and curing the above first paint is preferably set according to the solvent used, a boiling point of the organic solvent held inside the hollow microcapsules, and the like. In this case, the average paint film thickness of the first paint is preferably 1.1 times or more the average diameter of the hollow microcapsules, and more preferably 1.4 times or more.

For example, when drying and curing the first paint, it is preferable to cure the first paint at a temperature in a range of 150 to 250° C. and to foam the above hollow microcapsules at a temperature in a range of 130 to 190° C. By setting the curing temperature of the first paint and the foaming temperature of the hollow microcapsules in the above ranges, it is possible to more reliably set the presence ratio Pv of the voids formed to be in the previously described range. The curing temperature of the first paint is more preferably 170° C. or more, and even more preferably 180° C. or more. The curing temperature of the first paint is more preferably 240° C. or less, and even more preferably 230° C. or less. The foaming temperature of the hollow microcapsules is more preferably 135° C. or more, and even more preferably 140° C. or more. The foaming temperature of the hollow microcapsules is more preferably 180° C. or less, and even more preferably 170° C. or less.

It is preferable that the metal sheet coated with the first paint is heated at a heating rate of 70 to 750° C./min to reach a peak metal temperature of 200 to 250° C., the peak metal temperature is held for 0.1 to 10 s, and then the metal sheet is cooled to 60° C. or less at a cooling rate of 3 to 460° C./s. By drying and curing the first paint along a heat pattern as described above, the pre-painted metal sheet with the void-containing paint film (paint film A) as described above can be manufactured more reliably.

The heating rate is more preferably 140 to 700° C./min, and even more preferably 210 to 600° C./min. The peak metal temperature is more preferably 210 to 240° C., and even more preferably 215 to 230° C. The holding time at the peak metal temperature is more preferably 0.2 to 5.0 s, and even more preferably 0.4 to 3.0 s. The cooling rate is more preferably 150 to 350° C./s, and even more preferably 200 to 300° C./s.

In the case of forming the second paint film (paint film B) that does not contain the voids, a second paint that does not contain the hollow microcapsules is prepared, then the second paint is coated using the same coating method as the first paint and then dried and cured.

For example, it is preferable to form a multilayer curtain film formed by the first paint and second paint and coat the surface of the metal sheet by the curtain coating method.

The chemical treatment layer and/or the primer layer may also be provided to improve the adhesiveness and corrosion resistance of the pre-painted metal sheet. In this case, a chemical treatment solution to form the chemical treatment layer or a treatment solution to form the primer layer can be coated by various known methods, such as, for example, the roll coating method, the curtain coating method, and the spraying method.

Hereinabove, the manufacturing method of the pre-painted metal sheet of this embodiment has been described in detail.

(Burn-Prevention Cover)

As described above, the pre-painted metal sheet of this embodiment has the paint film A and thus can achieve a heat-insulating effect. Therefore, a burn-prevention cover can be obtained by using such a pre-painted metal sheet.

In this case, the pre-painted metal sheet is placed so that a heat source is located on an opposite side of the paint film A. This makes it possible to effectively insulate heat generated from the heat source.

EXAMPLES

The pre-painted metal sheet and the manufacturing method of the pre-painted metal sheet according to the present invention will be concretely described by presenting examples and comparative examples below. The examples presented below are only one example of the pre-painted metal sheet and the manufacturing method of the pre-painted metal sheet according to the present invention, and the pre-painted metal sheet and the manufacturing method of the pre-painted metal sheet of the present invention are not limited to the following examples.

<1. Preparation of Varnish Paint>

«Varnish Formulation-1»

"Byron (registered trademark) 270", an amorphous polyester resin manufactured by Toyobo Co., Ltd., was dissolved in an organic solvent (a mixture of cyclohexanone:Sorbeso 150 (product name)=1:1 by mass ratio). Next, "Cymel (registered trademark) 303", a methyl-melamine formaldehyde resin manufactured by Allnex Japan Inc., and "Mycoat (registered trademark) 506", a butyl group melamine resin manufactured by Allnex Japan Inc., were added as curing agents to the above solution. The methyl-melamine formaldehyde resin and butyl group melamine resin were mixed 1:1 in a resin solid mass ratio to adjust a mixed melamine resin. The polyester resin and mixed melamine resin were then adjusted to a solid mass ratio of 100:30. In addition, 0.5 mass % of "Catalyst 600", an acid catalyst manufactured by Allnex Japan Inc., was further added to the mixed solution of the polyester resin and melamine resin. The mixed solution was then stirred to obtain varnish formulation-1.

«Varnish Formulation-2»

"UWR (registered trademark) S-2818", an acrylic resin manufactured by Nippon Shokubai Co., Ltd., was dissolved in the organic solvent (the mixture of cyclohexanone: Solvesso 150 (product name)=1:1 by mass ratio). Next, "Cymel (registered trademark) 303", the methyl-melamine formaldehyde resin manufactured by Allnex Japan Inc., and "Mycoat (registered trademark) 506", the butyl group melamine resin manufactured by Allnex Japan Inc., were added as the curing agents to the above solution. The methyl-melamine formaldehyde resin and butyl group melamine resin were mixed 1:1 in a resin solid mass ratio to adjust the mixed melamine resin. The acrylic resin and mixed melamine resin were then adjusted to a solid mass ratio of 100:30. In addition, 0.5 mass % of "Catalyst 600", the acid catalyst manufactured by Allnex Japan Inc., was further added to this mixed solution of the acrylic resin and melamine resin. The mixed solution was then stirred to obtain varnish formulation-2.

«Varnish Formulation-3»

"EPICLON (registered trademark) EXA-123", an epoxy resin manufactured by DIC Corporation, was dissolved in the organic solvent (the mixture of cyclohexanone:Solvesso 150 (product name)=1:1 by mass ratio). Next, block isocyanate "CORONATE (registered trademark) 2507" manufactured by Tosoh Corporation was added to the above solution as the curing agent. The epoxy resin and block isocyanate were then adjusted to a solid mass ratio of 100:20. The mixed solution was then stirred to obtain varnish formulation-3.

<2. Preparation of Paint for Steel Sheet Coating>

Hollow microcapsules A: "Advancell (registered trademark) EHM303", B: "Advancell (registered trademark) EM306", C: "Advancell (registered trademark) EM406", D: Advancell (registered trademark) EHM303, or E: Advancell (registered trademark) HB-2051" manufactured by Sekisui Chemical Co., Ltd. was added to the above varnish paint. Types of hollow microcapsules added and their mass concentrations to the paint solid content were listed in Table 1 below.

A: Divinylbenzene polymer (Micropearl (registered trademark)) manufactured by Sekisui Chemical Co., Ltd. and/or B: polyacrylonitrile (Torayca (registered trademark) matting) manufactured by Toray Industries, Inc., which were crushed and classified with a sieve, were used as the fine particles.

C: Acrylic beads (MBX-20, manufactured by Sekisui Chemical Co., Ltd.) and D: urethane beads (Art pearl (registered trademark)-C, manufactured by Negami Chemical Industrial Co., Ltd.) were dispersed in ratios listed in Table 1, respectively as other fine particles, to prepare predetermined paints for steel sheet coating.

<3. Preparation of Test Materials>

Then, an electrogalvanized steel sheet (manufactured by Nippon Steel Corporation, a plating weight of 20 g/m$^2$ per side, hereafter abbreviated as "EG") was prepared and a chemical conversion treatment paint film was formed on both sides of the steel sheet. The chemical conversion treatment paint film was formed by coating a chromate-free chemical treatment solution "CT-E300 N" manufactured by Nihon Parkerizing Co., Ltd., under a condition of a deposition amount to be 300 mg/m$^2$ after dried and drying at a steel sheet temperature of 60° C. Subsequently, the paint described above was coated and dried.

Various types of metal sheets listed below were also prepared, and test materials were prepared in the same manner as above.

Sn-plated steel sheet (manufactured by Nippon Steel Corporation, a plating weight of 3 g/m$^2$ per side, hereafter abbreviated as "Sn")

Zn-55% Al plated steel sheet (manufactured by Nippon Steel Coated Sheet Corporation, a plating weight of 90 g/m$^2$ per side)

Zn-11% Al-3% Mg plated steel sheet (manufactured by Nippon Steel Corporation, a plating weight of 60 g/m$^2$ per side)

Al-10% Si plated steel sheet (manufactured by Nippon Steel Corporation, a plating weight of 40 g/m$^2$ per side)

Zn-10% Ni plated steel sheet (manufactured by Nippon Steel Corporation, a plating weight of 20 g/m$^2$ per side)

Zn-10% Fe plated steel sheet (manufactured by Nippon Steel Corporation, a plating weight of 45 g/m$^2$ per side)

Aluminum plate (AL 1050)

Stainless plate (SUS 304)

Copper plate (Cu C1100P)

Magnesium plate (Mg AZ31B)

Several types of test materials #1 to #66 were thereby prepared with various parameters changed as listed in Table 1-1 and Table 1-2 below.

Test material #1 did not contain the hollow microcapsules.

Test materials #2 to #7 were those in which the type and concentration of the hollow microcapsules dispersed in the paint film were changed. Test materials #8 to #13 were those in which the fine particles of different types and average particle diameters were dispersed in the paint film of Test material #10. Test materials #14 to #18 were those in which the paint film thickness and the average particle diameter of the fine particles were changed.

Test materials #19 to #22 were those in which the paint film without the voids was formed on a surface of Test material #10 as the second coating layer. Test materials #23 and #24 were those in which the type of the fine particles was changed. Test materials #25 to #31 were those in which the type of the base sheet (metal sheet) was changed.

Test material #32 was the one in which the chemical conversion treatment paint film on a rear surface of Test material #30 was omitted. Test material #33 was the one in which the deposition amount of the chemical conversion treatment paint film on a rear surface of Test material #10 was set to 2 g/m$^2$.

Test material #34 was the one in which the base sheet of Test material #7 was changed to an Sn-plated steel sheet. Test material #35 was the one in which 60 parts by mass of titanium oxide were added to the paint film of Test material #7 as the color pigment. Test material #36 was the one in which 10 parts by mass of carbon black were added to the paint film of Test material #7 as the color pigment.

Test materials #37 and #39 were those in which the type of varnish of Test material #10 was changed. Test materials #38 and #40 were those in which the type of varnish forming a first paint film layer of Test material #20 was changed. Test material #41 was the one in which the type of varnish forming a second paint film layer of Test material #20 was changed.

Test materials #42 and #43 were those in which the emissivity on the rear surface of the base sheet was changed. More precisely, they were each coated with a paint film in which 2 parts by mass of carbon black were added to the varnish formulation-1 as the color pigment. In this case, film thicknesses were adjusted so that the emissivities of the rear surfaces were 0.4 and 0.3, respectively.

Test materials #44, #45, and #46 were those in which the content of the fine particles P of Test material #11 was changed.

Test materials #47 to #50 were those in which the heating rate when the paint was dried and cured was changed. Test materials #51 to #53 were those in which the average film thickness T of the first paint film layer was changed by changing the attained sheet temperature when the paint was dried and cured.

Test material #54 was the one in which the first paint film layer was eliminated by setting the attained sheet temperature at an extremely high value when the paint was dried and cured to intentionally carbonize the first paint film layer. Test materials #55 to #58 were those in which the holding time for drying and curing the paint was changed. Test materials #59 to #62 were those in which the cooling rate when the paint was dried and cured was changed.

Test materials #63 and #64 were those in which the chemical conversion treatment paint film on the rear surface was omitted. Test materials #65 and #66 were those in which the paint film without the voids was formed as the second paint film layer.

For all test materials, the chemical conversion treatment paint films were coated with a bar coater. The first paint film layer, which corresponds to a paint film located on the metal sheet side, was coated with a sliding curtain coater. For the second paint film layer, which is a paint film located on an upper layer of the first paint film layer, those described as "multilayer simultaneously" were coated simultaneously by forming a curtain film together with the first paint film layer using the sliding curtain coater. Those described as "sequential," the first paint film layer was coated and baked, and then the second paint film layer was further coated using the sliding curtain coater and baked. The thickness of the base sheet was 0.8 mm for all test materials. Since a base sheet "Sn" with the thickness of 0.8 mm was not available, a base sheet with the thickness of 0.5 mm was used.

TABLE 1-1

| | | | FIRST PAINT FILM LAYER | | | | | | | MANUFACTURING METHOD | | | | |
|---|---|---|---|---|---|---|---|---|---|---|---|---|---|---|
| | | | HOLLOW MICROCAPSULES | | | | FINE PARTICLES | | | | CURING | | PEAK | |
| BASE SHEET | RESIN TYPE | TYPE | FOAMING START TEMPERATURE [°C] | AVERAGE PARTICLE DIAMETER [μm] | CONCENTRATION IN PAINT FILM [mass %] | TYPE | AVERAGE PARTICLE DIAMETER t [μm] | 10% COMPRESSIVE STRENGTH [MPa] | CONCENTRATION IN PAINT FILM [area %] | AVERAGE FILM THICKNESS OF PAINT [μm] | START TEMPERATURE [°C] | HEATING RATE [°C/min] | SHEET TEMPERATURE [°C] | HOLDING TIME [s] | COOLING RATE [°C/s] |
| 1 | EG | VARNISH PAINT-1 | — | — | — | 0 | — | — | — | 0 | 40 | 150 | 280 | 230 | 1 | 200 |
| 2 | EG | VARNISH PAINT-1 | A | 120 | 30 | 10 | — | 0 | — | 0 | 40 | 150 | 280 | 230 | 1 | 200 |
| 3 | EG | VARNISH PAINT-1 | B | 135 | 25 | 10 | — | 0 | — | 0 | 40 | 150 | 280 | 230 | 1 | 200 |
| 4 | EG | VARNISH PAINT-1 | C | 145 | 30 | 10 | — | 0 | — | 0 | 40 | 150 | 280 | 230 | 1 | 200 |
| 5 | EG | VARNISH PAINT-1 | D | 170 | 20 | 10 | — | 0 | — | 0 | 40 | 150 | 280 | 230 | 1 | 200 |
| 6 | EG | VARNISH PAINT-1 | C | 145 | 30 | 20 | — | 0 | — | 0 | 40 | 150 | 280 | 230 | 1 | 200 |
| 7 | EG | VARNISH PAINT-1 | C | 145 | 30 | 30 | — | 0 | — | 0 | 40 | 150 | 280 | 230 | 1 | 200 |
| 8 | EG | VARNISH PAINT-1 | C | 145 | 30 | 30 | A | 85 | 35 | 10 | 40 | 150 | 280 | 230 | 1 | 200 |
| 9 | EG | VARNISH PAINT-1 | C | 145 | 30 | 30 | A | 100 | 35 | 10 | 40 | 150 | 280 | 230 | 1 | 200 |
| 10 | EG | VARNISH PAINT-1 | C | 145 | 30 | 30 | A | 120 | 35 | 10 | 40 | 150 | 280 | 230 | 1 | 200 |

TABLE 1-1-continued

| | | | | | | | | | | | | | | | | | |
|---|---|---|---|---|---|---|---|---|---|---|---|---|---|---|---|---|---|
| 11 | EG | VARNISH-PAINT-1 | C | 145 | 30 | 30 | A | 180 | 35 | 10 | 40 | 150 | 280 | 230 | 1 | 200 |
| 12 | EG | VARNISH-PAINT-1 | C | 145 | 30 | 30 | A | 350 | 35 | 10 | 40 | 150 | 280 | 230 | 1 | 200 |
| 13 | EG | VARNISH-PAINT-1 | C | 145 | 30 | 30 | A | 400 | 35 | 10 | 40 | 150 | 280 | 230 | 1 | 200 |
| 14 | EG | VARNISH-PAINT-1 | C | 145 | 30 | 50 | A | 200 | 35 | 10 | 40 | 150 | 280 | 230 | 1 | 200 |
| 15 | EG | VARNISH-PAINT-1 | E | 145 | 30 | 30 | B | 40 | 37 | 10 | 40 | 150 | 280 | 230 | 1 | 200 |
| 16 | EG | VARNISH-PAINT-1 | C | 145 | 30 | 30 | A | 500 | 35 | 10 | 40 | 150 | 280 | 230 | 1 | 200 |
| 17 | EG | VARNISH-PAINT-1 | C | 145 | 30 | 30 | B | 900 | 35 | 10 | 40 | 150 | 280 | 230 | 1 | 200 |
| 18 | EG | VARNISH-PAINT-1 | C | 145 | 30 | 30 | B | 1000 | 37 | 10 | 40 | 150 | 280 | 230 | 1 | 200 |
| 19 | EG | VARNISH-PAINT-1 | C | 145 | 30 | 30 | A | 120 | 35 | 10 | 40 | 150 | 280 | — | 1 | 200 |
| 20 | EG | VARNISH-PAINT-1 | C | 145 | 30 | 30 | A | 120 | 35 | 10 | 40 | 150 | 280 | — | 1 | 200 |
| 21 | EG | VARNISH-PAINT-1 | C | 145 | 30 | 30 | A | 120 | 35 | 10 | 40 | 150 | 280 | — | 1 | 200 |
| 22 | EG | VARNISH-PAINT-1 | C | 145 | 30 | 30 | A | 120 | 35 | 10 | 40 | 150 | 280 | 230 | 1 | 200 |
| 23 | EG | VARNISH-PAINT-1 | C | | 30 | 30 | C | 120 | 25 | 10 | 40 | 150 | 260 | — | 1 | 200 |

TABLE 1-1-continued

| | | | | | | | | | | | | | | | | | |
|---|---|---|---|---|---|---|---|---|---|---|---|---|---|---|---|---|---|
| 24 | EG | VARNISH PAINT-1 | C | 145 | 30 | 30 | D | 120 | 0.3 | 10 | 40 | 150 | 280 | — | 1 | 200 |
| 25 | Zn-55% Al | VARNISH PAINT-1 | C | 145 | 30 | 30 | A | 120 | 35 | 10 | 40 | 150 | 280 | 230 | 1 | 200 |
| 26 | Zn-11% Al-3% Mg | VARNISH PAINT-1 | C | 145 | 30 | 30 | A | 120 | 35 | 10 | 40 | 150 | 280 | 230 | 1 | 200 |
| 27 | Al-10% Si | VARNISH PAINT-1 | C | 145 | 30 | 30 | A | 120 | 35 | 10 | 40 | 150 | 280 | 230 | 1 | 200 |
| 28 | 20-10% Ni | VARNISH PAINT-1 | C | 145 | 30 | 30 | A | 120 | 35 | 10 | 40 | 150 | 280 | 230 | 1 | 200 |
| 29 | Zn-10% Fe | VARNISH PAINT-1 | C | 145 | 30 | 30 | A | 120 | 35 | 10 | 40 | 150 | 280 | 230 | 1 | 200 |
| 30 | AL 1050 | VARNISH PAINT-1 | C | 145 | 30 | 30 | A | 120 | 35 | 10 | 40 | 150 | 280 | 230 | 1 | 200 |
| 31 | SUS 304 | VARNISH PAINT-1 | C | 145 | 30 | 30 | A | 120 | 35 | 10 | 40 | 150 | 280 | 230 | 1 | 200 |
| 32 | AL 1050 | VARNISH PAINT-1 | C | 145 | 30 | 30 | A | 120 | 35 | 10 | 40 | 150 | 280 | 230 | 1 | 200 |
| 33 | EG | VARNISH PAINT-1 | C | 145 | 30 | 30 | A | 120 | 35 | 10 | 40 | 150 | 280 | 230 | 1 | 200 |

TABLE 1-1-continued

|   | AVERAGE FILM THICKNESS T [μm] | VOID RATIO [%] | t/T | dv (μm) | T/dv | SECOND PAINT FILM LAYER COATING METHOD | RESIN TYPE | AVERAGE FILM THICKNESS [μm] | PEAK TEMPERATURE [°C] | REAR SURFACE EMISSIVITY | REMARKS |
|---|---|---|---|---|---|---|---|---|---|---|---|
| 1 | 10 | 0 | 0.00 | — | — | — | — | — | — | 0.2 | COMPARATIVE EXAMPLE |
| 2 | 110 | 81 | 0.00 | 105 | 1.05 | — | — | — | — | 0.2 | COMPARATIVE EXAMPLE |
| 3 | 150 | 93 | 0.00 | 135 | 1.11 | — | — | — | — | 0.2 | COMPARATIVE EXAMPLE |
| 4 | 60 | 54 | 0.00 | 42 | 1.43 | — | — | — | — | 0.2 | COMPARATIVE EXAMPLE |
| 5 | 50 | 41 | 0.00 | 33 | 1.54 | — | — | — | — | 0.2 | COMPARATIVE EXAMPLE |
| 6 | 80 | 67 | 0.00 | 56 | 1.43 | — | — | — | — | 0.2 | COMPARATIVE EXAMPLE |
| 7 | 120 | 89 | 0.00 | 84 | 1.43 | — | — | — | — | 0.2 | COMPARATIVE EXAMPLE |
| 8 | 120 | 89 | 0.71 | 84 | 1.43 | — | — | — | — | 0.2 | EXAMPLE |
| 9 | 120 | 89 | 0.83 | 84 | 1.43 | — | — | — | — | 0.2 | EXAMPLE |
| 10 | 120 | 89 | 1.00 | 84 | 1.43 | — | — | — | — | 0.2 | EXAMPLE |
| 11 | 120 | 89 | 1.50 | 84 | 1.43 | — | — | — | — | 0.2 | EXAMPLE |
| 12 | 120 | 89 | 2.92 | 84 | 1.43 | — | — | — | — | 0.2 | EXAMPLE |
| 13 | 120 | 89 | 3.33 | 84 | 1.43 | — | — | — | — | 0.2 | COMPARATIVE EXAMPLE |

TABLE 1-1-continued

| | | | | | | | | | | | |
|---|---|---|---|---|---|---|---|---|---|---|---|
| 14 | 235 | 97 | 0.85 | 165 | 1.43 | — | — | — | — | 0.2 | COMPARATIVE EXAMPLE |
| 15 | 45 | 41 | 0.59 | 23 | 2.00 | — | — | — | — | 0.2 | EXAMPLE |
| 16 | 530 | 90 | 0.94 | 371 | 1.43 | — | — | — | — | 0.2 | EXAMPLE |
| 17 | 950 | 91 | 0.95 | 665 | 1.43 | — | — | — | — | 0.2 | EXAMPLE |
| 18 | 1020 | 93 | 0.58 | 714 | 1.43 | — | — | — | — | 0.2 | EXAMPLE |
| 19 | 120 | 89 | 1.00 | 84 | 1.43 | MULTI-LAYER SIMULTANEOUSLY | VARNISH PAINT-1 | 0.5 | 230 | 0.2 | EXAMPLE |
| 20 | 120 | 89 | 1.00 | 84 | 1.43 | MULTI-LAYER SIMULTANEOUSLY | VARNISH PAINT-1 | 5 | 230 | 0.2 | EXAMPLE |
| 21 | 120 | 89 | 1.00 | 84 | 1.43 | MULTI-LAYER SIMULTANEOUSLY | VARNISH PAINT-1 | 20 | 230 | 0.2 | EXAMPLE |
| 22 | 120 | 89 | 1.00 | 84 | 1.43 | MULTI-LAYER SEQUENTIAL | VARNISH PAINT-1 | 20 | 230 | 0.2 | EXAMPLE |
| 23 | 120 | 89 | 1.00 | 84 | 1.43 | MULTI-LAYER SIMULTANEOUSLY | VARNISH PAINT-1 | 5 | 230 | 0.2 | EXAMPLE |
| 24 | 120 | 89 | 1.00 | 84 | 1.43 | MULTI-LAYER SIMULTANEOUSLY | VARNISH PAINT-1 | 5 | 230 | 0.2 | EXAMPLE |
| 25 | 120 | 89 | 1.00 | 84 | 1.43 | — | — | — | — | 0.2 | COMPARATIVE EXAMPLE |
| 26 | 120 | 89 | 1.00 | 84 | 1.43 | — | — | — | — | 0.2 | COMPARATIVE EXAMPLE |
| 27 | 120 | 89 | 1.00 | 84 | 1.43 | — | — | — | — | 0.2 | EXAMPLE |
| 28 | 120 | 89 | 1.00 | 84 | 1.43 | — | — | — | — | 0.2 | EXAMPLE |
| 29 | 120 | 89 | 1.00 | 84 | 1.43 | — | — | — | — | 0.5 | EXAMPLE |

TABLE 1-1-continued

| 30 | 120 | 89 | 1.00 | 84 | 1.43 | — | — | — | — | 0.2 | EX-AMPLE |
| 31 | 120 | 89 | 1.00 | 84 | 1.43 | — | — | — | — | 0.2 | EX-AMPLE |
| 32 | 120 | 89 | 1.00 | 84 | 1.43 | — | — | — | — | 0.1 | EX-AMPLE |
| 33 | 120 | 89 | 1.00 | 84 | 1.43 | — | — | — | — | 0.3 | EX-AMPLE |

TABLE 1-2

| | | | FIRST PAINT FILM LAYER | | | | | | | | MANUFACTURING METHOD | | | | |
|---|---|---|---|---|---|---|---|---|---|---|---|---|---|---|---|
| | | | HOLLOW MICROCAPSULES | | | | FINE PARTICLES | | | AVERAGE FILM THICKNESS OF PAINT [μm] | CURING START TEMPERATURE [° C.] | HEATING RATE [° C./min] | PEAK SHEET TEMPERATURE [° C.] | HOLDING TIME [s] | COOLING RATE [° C./s] |
| | BASE SHEET | RESIN TYPE | TYPE | FOAMING START TEMPERATURE [° C.] | AVERAGE PARTICLE DIAMETER [μm] | CONCENTRATION IN PAINT FILM [mass %] | TYPE | AVERAGE PARTICLE DIAMETER t [μm] | 10% COMPRESSIVE STRENGTH [MPa] | CONCENTRATION IN PAINT FILM [area %] | | | | | | |
| 34 | Sn | VARNISH PAINT-1 | C | 145 | 30 | 30 | A | 120 | 35 | 10 | 40 | 150 | 280 | 230 | 1 | 200 |
| 35 | EG | VARNISH PAINT-1 | C | 145 | 30 | 30 | A | 120 | 35 | 10 | 40 | 150 | 280 | 230 | 1 | 200 |
| 36 | EG | VARNISH PAINT-1 | C | 145 | 30 | 30 | A | 120 | 35 | 10 | 40 | 150 | 280 | 230 | 1 | 200 |
| 37 | EG | VARNISH PAINT-1 | C | 145 | 30 | 30 | A | 120 | 35 | 10 | 40 | 160 | 280 | 230 | 1 | 200 |
| 38 | EG | VARNISH PAINT-2 | C | 145 | 30 | 30 | A | 120 | 35 | 10 | 40 | 160 | 280 | — | 1 | 200 |
| 39 | EG | VARNISH PAINT-2 | C | 145 | 30 | 30 | A | 120 | 35 | 10 | 40 | 180 | 280 | 230 | 1 | 200 |
| 40 | EG | VARNISH PAINT-3 | C | 145 | 30 | 30 | A | 120 | 35 | 10 | 40 | 180 | 280 | — | 1 | 200 |
| 41 | EG | VARNISH PAINT-3 | C | 145 | 30 | 30 | A | 120 | 35 | 10 | 40 | 150 | 280 | — | 1 | 200 |
| 42 | EG | VARNISH PAINT-1 | C | 145 | 30 | 30 | A | 120 | 35 | 10 | 40 | 150 | 280 | — | 1 | 200 |
| 43 | EG | VARNISH PAINT-1 | C | 145 | 30 | 30 | A | 120 | 35 | 10 | 40 | 150 | 280 | — | 1 | 200 |

TABLE 1-2-continued

| | | | | | | | | | | | | | | | |
|---|---|---|---|---|---|---|---|---|---|---|---|---|---|---|---|
| 44 | EG | VAR-NISH PAINT-1 | C | 145 | 30 | 30 | A | 180 | 35 | 1 | 40 | 150 | 280 | 230 | 1 | 200 |
| 45 | EG | VAR-NISH PAINT-1 | C | 145 | 30 | 30 | A | 180 | 35 | 40 | 40 | 150 | 280 | 230 | 1 | 200 |
| 46 | EG | VAR-NISH PAINT-1 | C | 145 | 30 | 30 | A | 180 | 35 | 50 | 40 | 150 | 280 | 230 | 1 | 200 |
| 47 | EG | VAR-NISH PAINT-1 | C | 145 | 30 | 30 | A | 900 | 35 | 10 | 40 | 150 | 70 | 230 | 1 | 200 |
| 48 | EG | VAR-NISH PAINT-1 | C | 145 | 30 | 30 | A | 1000 | 35 | 10 | 40 | 150 | 60 | 230 | 1 | 200 |
| 49 | EG | VAR-NISH PAINT-1 | C | 145 | 30 | 30 | A | 40 | 35 | 10 | 40 | 150 | 750 | 230 | 1 | 200 |
| 50 | EG | VAR-NISH PAINT-1 | C | 145 | 30 | 30 | A | 40 | 35 | 10 | 40 | 150 | 800 | 230 | 1 | 200 |
| 51 | EG | VAR-NISH PAINT-1 | C | 145 | 30 | 30 | A | 90 | 35 | 10 | 40 | 150 | 280 | 190 | 1 | 200 |
| 52 | EG | VAR-NISH PAINT-1 | C | 145 | 30 | 30 | A | 180 | 35 | 10 | 40 | 150 | 280 | 200 | 1 | 200 |
| 53 | EG | VAR-NISH PAINT-1 | C | 145 | 30 | 30 | A | 180 | 35 | 10 | 40 | 150 | 280 | 250 | 1 | 200 |
| 54 | EG | VAR-NISH PAINT-1 | C | 145 | 30 | 30 | A | 180 | 35 | 10 | 40 | 150 | 280 | 280 | 1 | 200 |
| 55 | EG | VAR-NISH PAINT-1 | C | 145 | 30 | 30 | A | 120 | 35 | 10 | 40 | 150 | 280 | 200 | 0.2 | 200 |
| 56 | EG | VAR-NISH PAINT-1 | C | 145 | 30 | 30 | A | 120 | 35 | 10 | 40 | 150 | 280 | 200 | 0.5 | 200 |

TABLE 1-2-continued

| | | | | | | | | | | | | | | | |
|---|---|---|---|---|---|---|---|---|---|---|---|---|---|---|---|
| 57 | EG | VAR-NISH PAINT-1 | C | 145 | 30 | 30 | A | 120 | 35 | 10 | 40 | 150 | 280 | 200 | 10 | 200 |
| 58 | EG | VAR-NISH PAINT-1 | C | 145 | 30 | 30 | A | 180 | 35 | 10 | 40 | 150 | 280 | 200 | 20 | 200 |
| 59 | EG | VAR-NISH PAINT-1 | C | 145 | 30 | 30 | A | 180 | 35 | 10 | 40 | 150 | 280 | 250 | 1 | 0.7 |
| 60 | EG | VAR-NISH PAINT-1 | C | 145 | 30 | 30 | A | 180 | 35 | 10 | 40 | 150 | 280 | 250 | 1 | 5 |
| 61 | EG | VAR-NISH PAINT-1 | C | 145 | 30 | 30 | A | 180 | 35 | 10 | 40 | 150 | 280 | 250 | 1 | 230 |
| 62 | EG | VAR-NISH PAINT-1 | C | 145 | 30 | 30 | A | 180 | 35 | 10 | 40 | 150 | 280 | 250 | 1 | 400 |
| 63 | Cu C1100P | VAR-NISH PAINT-1 | C | 145 | 30 | 30 | A | 120 | 35 | 10 | 40 | 150 | 280 | 230 | 1 | 200 |
| 64 | Mg AZ31B | VAR-NISH PAINT-1 | C | 145 | 30 | 30 | A | 120 | 35 | 10 | 40 | 150 | 280 | 230 | 1 | 200 |
| 65 | EG | VAR-NISH PAINT-1 | C | 145 | 30 | 30 | A | 140 | 35 | 10 | 40 | 150 | 300 | — | 1 | 200 |
| 66 | EG | VAR-NISH PAINT-1 | C | 145 | 30 | 30 | A | 150 | 35 | 10 | 40 | 150 | 310 | — | 1 | 200 |

TABLE 1-2-continued

| | AVERAGE FILM THICKNESS T [μm] | VOID RATIO [%] | t/T | dv [μm] | T/dv | SECOND PAINT FILM LAYER | | | | | REAR SURFACE EMISSIVITY | REMARKS |
|---|---|---|---|---|---|---|---|---|---|---|---|---|
| | | | | | | COATING METHOD | RESIN TYPE | AVERAGE FILM THICKNESS [μm] | PEAK TEMPERATURE [° C.] | | | |
| 34 | 120 | 89 | 1.00 | 84 | 1.43 | — | — | — | — | | 0.2 | EXAMPLE |
| 35 | 120 | 89 | 1.00 | 84 | 1.43 | — | — | — | — | | 0.2 | EXAMPLE |
| 36 | 120 | 89 | 1.00 | 84 | 1.43 | — | — | — | — | | 0.2 | EXAMPLE |
| 37 | 120 | 89 | 1.00 | 84 | 1.43 | — | — | — | — | | 0.2 | EXAMPLE |
| 38 | 120 | 89 | 1.00 | 84 | 1.43 | MULTI-LAYER SIMULTANEOUSLY | VARNISH PAINT-1 | 5 | 230 | | 0.2 | EXAMPLE |
| 39 | 120 | 89 | 1.00 | 84 | 1.43 | — | — | — | — | | 0.2 | EXAMPLE |
| 40 | 120 | 89 | 1.00 | 84 | 1.43 | MULTI-LAYER SIMULTANEOUSLY | VARNISH PAINT-1 | 5 | 230 | | 0.2 | EXAMPLE |
| 41 | 120 | 89 | 1.00 | 84 | 1.43 | MULTI-LAYER SIMULTANEOUSLY | VARNISH PAINT-1 | 5 | 230 | | 0.2 | EXAMPLE |
| 42 | 120 | 89 | 1.00 | 84 | 1.43 | MULTI-LAYER SIMULTANEOUSLY | VARNISH PAINT-1 | 5 | 230 | | 0.4 | EXAMPLE |
| 43 | 120 | 89 | 1.00 | 84 | 1.43 | MULTI-LAYER SIMULTANEOUSLY | VARNISH PAINT-1 | 5 | 230 | | 0.3 | EXAMPLE |
| 44 | 120 | 89 | 1.50 | 84 | 1.43 | — | — | — | — | | 0.2 | EXAMPLE |
| 45 | 120 | 89 | 1.50 | 84 | 1.43 | — | — | — | — | | 0.2 | EXAMPLE |
| 46 | 120 | 89 | 1.50 | 84 | 1.43 | — | — | — | — | | 0.2 | EXAMPLE |
| 47 | 950 | 92 | 0.95 | 665 | 1.43 | — | — | — | — | | 0.2 | EXAMPLE |
| 48 | 1120 | 97 | 0.89 | 784 | 1.43 | — | — | — | — | | 0.2 | COMPARATIVE EXAMPLE |
| 49 | 52 | 42 | 0.77 | 36 | 1.43 | — | — | — | — | | 0.2 | EXAMPLE |

TABLE 1-2-continued

| | | | | | | | | | | |
|---|---|---|---|---|---|---|---|---|---|---|
| 50 | 38 | 35 | 1.05 | 27 | 1.43 | — | — | — | 0.2 | COMPARATIVE EXAMPLE |
| 51 | 83 | 52 | 1.08 | 58 | 1.43 | — | — | — | 0.2 | EXAMPLE |
| 52 | 103 | 75 | 1.75 | 72 | 1.43 | — | — | — | 0.2 | EXAMPLE |
| 53 | 195 | 90 | 0.92 | 137 | 1.43 | — | — | — | 0.2 | EXAMPLE |
| 54 | — | — | — | — | — | — | — | — | — | COMPARATIVE EXAMPLE |
| 55 | 80 | 51 | 1.50 | 56 | 1.43 | — | — | — | 0.2 | EXAMPLE |
| 56 | 105 | 89 | 1.14 | 74 | 1.43 | — | — | — | 0.2 | EXAMPLE |
| 57 | 120 | 89 | 1.00 | 84 | 1.43 | — | — | — | 0.2 | EXAMPLE |
| 58 | 182 | 90 | 0.99 | 127 | 1.43 | — | — | — | 0.2 | EXAMPLE |
| 59 | 120 | 89 | 1.50 | 84 | 1.43 | — | — | — | 0.2 | EXAMPLE |
| 60 | 120 | 89 | 1.50 | 84 | 1.43 | — | — | — | 0.2 | EXAMPLE |
| 61 | 120 | 89 | 1.50 | 84 | 1.43 | — | — | — | 0.2 | EXAMPLE |
| 62 | 120 | 89 | 1.50 | 84 | 1.43 | — | — | — | 0.2 | EXAMPLE |
| 63 | 120 | 89 | 1.00 | 84 | 1.43 | — | — | — | 0.1 | EXAMPLE |
| 64 | 120 | 89 | 1.00 | 84 | 1.43 | — | — | — | 0.1 | EXAMPLE |
| 65 | 140 | 92 | 1.00 | 126 | 1.11 | MULTI-LAYER SIMULTANEOUSLY | VARNISH PAINT-1 | 5 | 230 | 0.2 | EXAMPLE |
| 66 | 150 | 89 | 1.00 | 147 | 1.02 | MULTI-LAYER SIMULTANEOUSLY | VARNISH PAINT-1 | 5 | 230 | 02 | EXAMPLE |

<4. Evaluation Test>

Next, the following evaluation tests were conducted. Details of the evaluation tests were as follows. Results obtained were summarized in Table 2 below.

[4-1. Process Adhesiveness]

The test material was subjected to T-bending (180° bending) process and the paint film on an outside of the bent portion was peeled off with adhesive tape (Cellotape (registered trademark) manufactured by Nichiban Co., Ltd.). Presence/absence of adhesion of the paint film to the tape side was observed. Then, the process adhesiveness was evaluated based on the following evaluation criteria.

In such adhesiveness tests, an acceptable level was defined as 2 or higher. Concretely, a score of 3 or higher was considered excellent adhesiveness, and a score of 2 or higher was considered acceptable (passing level). The T-bending was performed in an atmosphere of 25±3° C.

When the thickness of the test material is denoted as T, the T-bending is a bending process performed on the test material after placing a spacer with a thickness of "n" times the thickness T of the test material ("n" is an integer of 0 or more) at a position to be a gap in the bent portion. "0T" bending is a bending process performed without placing the spacer and, for example, "6T" bending is a bending process performed by placing the spacer with a thickness equivalent to 6 pieces of test materials. Therefore, the smaller the value of the number "n", the more severe the bending process is.

<4-1-1. Evaluation Criteria>
5: No paint film adhesion on tape side under 0T bending
4: No paint film adhesion on tape side under 2T bending
3: No paint film adhesion on tape side under 4T bending
2: No paint film adhesion on tape side under 6T bending
1: With paint film adhesion on tape side under 6T bending

[4-2. Finger Contact Temperature]

Figure 2A:
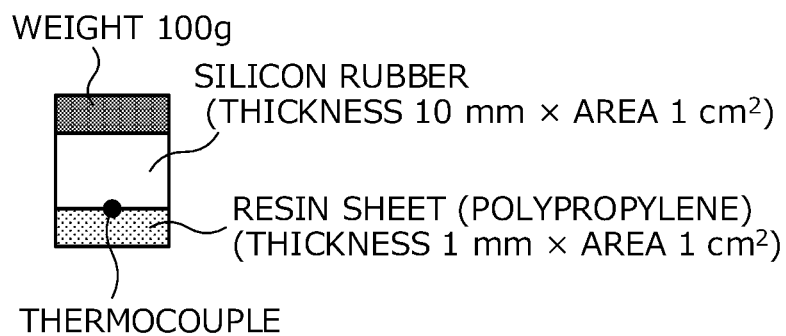
FIG. 2A is an explanatory diagram to explain a finger contact temperature measuring method in examples.
Figure 2B:
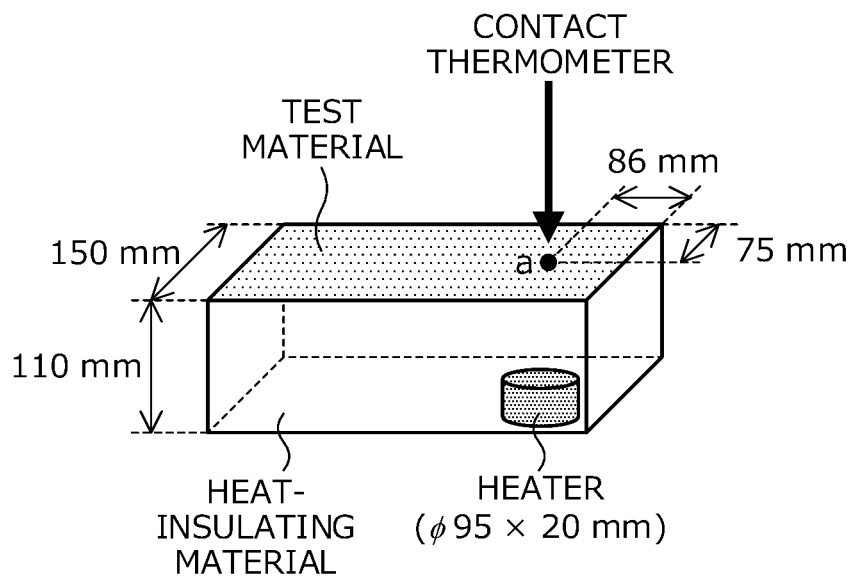
FIG. 2B is an explanatory diagram to explain a finger contact temperature measuring method in examples.

Each test material was set in a self-made finger contact temperature simulator with a configuration illustrated in FIG. 2A and FIG. 2B and a heater was turned on. Power of the heater was set to 42 W. After 1800 seconds from the start of the test, a temperature of a surface of the test material (a temperature at a position "a" in FIG. 2B) was measured with a contact thermometer simulating a finger with a layered structure as illustrated in FIG. 2A. The contact thermometer as illustrated in FIG. 2A was placed so that a resin sheet side was in contact with the test material. The temperature was measured 100 seconds after the start of the temperature measurement of the contact thermometer and evaluated based on the following criteria. In such a finger contact temperature test, an acceptable level was defined as 3 or higher. Concretely, a score of 4 or higher was considered excellent in burn prevention, and a score of 3 or higher was considered acceptable (passing level). The finger contact temperature measurement was performed in an atmosphere of 20±1° C. Thus, this evaluation item evaluated the performance of each test material when used as a burn-prevention cover.

«4-2-1. Finger Contact Temperature Evaluation Criteria»
5: 40° C. or less
4: more than 40° C. and 45° C. or less
3: more than 45° C. and 50° C. or less
2: more than 50° C. and 55° C. or less
1: more than 55° C.

[4-3. Pressure Test]

A pressure test was conducted by simulating a pressure to which the paint film of the pre-painted metal sheet is subjected when coiled. A surface (a surface on a side where the paint film A existed) and a rear surface (a surface on a side where the paint film A did not exist) of each test material were brought into contact with each other and a pressure of 10 MPa was applied and held for 30 minutes. The pressure test was conducted under a condition where the sheet temperature was 50±3° C. The pressure was then released, and the finger temperature measurement experiment listed in «4-2-1» was conducted and evaluated using the same evaluation criteria.

[4-4. Corrosion Resistance]

A center of the surface of the test material (the surface on the side where the paint film A existed) was subjected to 6 mm extrusion using an Erichsen processing machine (according to dimension A of JIS Z 2247). End faces of the test material were then tape-sealed and subjected to a salt spray test (SST) according to JIS Z 2371 for 120 hours. After the test, rusting of a portion subjected to the extrusion was observed, and corrosion resistance was evaluated based on the following evaluation criteria. No acceptable level was established because the product can be used even with a score of 1 depending on an operating environment.

«Evaluation Criteria»
3: No red rust
2: A red rust area is 1% or more and less than 10% of the total area of one surface of the test material
1: A red rust area is 10% or more of the total area of one surface of the test material

[4-5. Emissivity]

A size of the test material was 50×100 mm, a thermocouple was welded to one of four corners of the test material, and the temperature of the test material was recorded. The test material was then placed on a hot plate set at 100° C. to be in contact so that the rear surface (the surface on the side where the paint film A did not exist) faced upward. A radiation thermometer (radiation thermometer probe P-5 manufactured by Ichinen TASCO Co., Ltd.) was used to measure the temperature of the rear surface side of the test material. The radiation thermometer was placed at a position of 150 mm in a vertical direction of the test material. An emissivity of the radiation thermometer was adjusted, and the emissivity at which the temperature indicated by the radiation thermometer matched the temperature measured by the thermocouple was used as the emissivity of the rear surface of the test material. Measurement results of the emissivity of the rear surface are summarized in Table 1-1 and Table 1-2.

The results obtained are summarized in Table 2 below.

TABLE 2

| | PERFORMANCE | | | | |
| --- | --- | --- | --- | --- | --- |
| | PROCESS ADHESIVENESS | CORROSION RESISTANCE | CONTACT TEMPERATURE | CONTACT TEMPERATURE AFTER PRESSURIZED | REMARKS |
| 1 | 5 | 3 | 1 | 1 | COMPARATIVE EXAMPLE |
| 2 | — | 3 | 5 | 1 | COMPARATIVE EXAMPLE |

TABLE 2-continued

| | PERFORMANCE | | | | |
|---|---|---|---|---|---|
| | PROCESS ADHESIVENESS | CORROSION RESISTANCE | CONTACT TEMPERATURE | CONTACT TEMPERATURE AFTER PRESSURIZED | REMARKS |
| 3 | — | 3 | 5 | 1 | COMPARATIVE EXAMPLE |
| 4 | 2 | 3 | 3 | 1 | COMPARATIVE EXAMPLE |
| 5 | 3 | 3 | 2 | 1 | COMPARATIVE EXAMPLE |
| 6 | 5 | 3 | 4 | 1 | COMPARATIVE EXAMPLE |
| 7 | 5 | 3 | 5 | 1 | COMPARATIVE EXAMPLE |
| 8 | 3 | 3 | 5 | 4 | EXAMPLE |
| 9 | 2 | 3 | 5 | 5 | EXAMPLE |
| 10 | 2 | 3 | 5 | 5 | EXAMPLE |
| 11 | 4 | 3 | 5 | 5 | EXAMPLE |
| 12 | 2 | 3 | 5 | 5 | EXAMPLE |
| 13 | 1 | 3 | 5 | 5 | COMPARATIVE EXAMPLE |
| 14 | 1 | 3 | 5 | 5 | COMPARATIVE EXAMPLE |
| 15 | 3 | 3 | 3 | 3 | EXAMPLE |
| 16 | 2 | 3 | 5 | 5 | EXAMPLE |
| 17 | 2 | 3 | 5 | 5 | EXAMPLE |
| 18 | 2 | 3 | 5 | 5 | EXAMPLE |
| 19 | 3 | 3 | 5 | 5 | EXAMPLE |
| 20 | 5 | 3 | 5 | 5 | EXAMPLE |
| 21 | 5 | 3 | 5 | 5 | EXAMPLE |
| 22 | 4 | 3 | 5 | 5 | EXAMPLE |
| 23 | 5 | 3 | 5 | 2 | COMPARATIVE EXAMPLE |
| 24 | 5 | 3 | 5 | 1 | COMPARATIVE EXAMPLE |
| 25 | 2 | 3 | 5 | 5 | EXAMPLE |
| 26 | 2 | 3 | 5 | 5 | EXAMPLE |
| 27 | 2 | 2 | 5 | 5 | EXAMPLE |
| 28 | 2 | 3 | 5 | 5 | EXAMPLE |
| 29 | 2 | 3 | 3 | 3 | EXAMPLE |
| 30 | 2 | 3 | 5 | 5 | EXAMPLE |
| 31 | 2 | 3 | 5 | 5 | EXAMPLE |
| 32 | 2 | 3 | 5 | 5 | EXAMPLE |
| 33 | 2 | 3 | 5 | 5 | EXAMPLE |
| 34 | 2 | 1 | 5 | 5 | EXAMPLE |
| 35 | 2 | 5 | 5 | 5 | EXAMPLE |
| 36 | 2 | 3 | 5 | 5 | EXAMPLE |
| 37 | 2 | 3 | 5 | 5 | EXAMPLE |
| 38 | 4 | 3 | 4 | 4 | EXAMPLE |
| 39 | 2 | 3 | 5 | 5 | EXAMPLE |
| 40 | 5 | 3 | 5 | 5 | EXAMPLE |
| 41 | 5 | 3 | 5 | 5 | EXAMPLE |
| 42 | 5 | 3 | 3 | 3 | EXAMPLE |
| 43 | 5 | 3 | 4 | 3 | EXAMPLE |
| 44 | 5 | 3 | 5 | 3 | EXAMPLE |
| 45 | 3 | 3 | 5 | 5 | EXAMPLE |
| 46 | 2 | 3 | 5 | 5 | EXAMPLE |
| 47 | 2 | 3 | 5 | 5 | EXAMPLE |
| 48 | 1 | 3 | 5 | 5 | COMPARATIVE EXAMPLE |
| 49 | 3 | 3 | 3 | 3 | EXAMPLE |
| 50 | 1 | 2 | 2 | 2 | COMPARATIVE EXAMPLE |
| 51 | 5 | 3 | 4 | 4 | EXAMPLE |
| 52 | 2 | 3 | 4 | 4 | EXAMPLE |
| 53 | 4 | 3 | 5 | 5 | EXAMPLE |
| 54 | — | — | — | — | COMPARATIVE EXAMPLE |
| 55 | 2 | 2 | 4 | 4 | EXAMPLE |
| 56 | 2 | 3 | 4 | 4 | EXAMPLE |
| 57 | 4 | 3 | 5 | 5 | EXAMPLE |
| 58 | 2 | 3 | 5 | 4 | EXAMPLE |
| 59 | 2 | 3 | 5 | 5 | EXAMPLE |
| 60 | 4 | 3 | 5 | 5 | EXAMPLE |
| 61 | 4 | 3 | 5 | 5 | EXAMPLE |
| 62 | 2 | 2 | 4 | 3 | EXAMPLE |
| 63 | 2 | 3 | 5 | 5 | EXAMPLE |
| 64 | 2 | 3 | 5 | 5 | EXAMPLE |
| 65 | 4 | 3 | 5 | 5 | EXAMPLE |
| 66 | 3 | 3 | 5 | 5 | EXAMPLE |

As it is clear from Table 2 above, the test materials that correspond to the examples of this invention show evaluation results exhibiting excellent process adhesiveness and contact temperature, as well as excellent contact temperature after pressurization, and further, most of the test materials that correspond to the examples also exhibit excellent corrosion resistance.

On the other hand, the test materials that correspond to the comparative examples of the present invention are inferior in at least any of the following: process adhesiveness, contact temperature, or contact temperature after pressurization.

Hereinabove, the preferred embodiments of the present invention have been explained in detail, but the present invention is not limited to such examples. It is apparent that a person ordinary skilled in the art to which the present invention pertains is able to devise various changed or modified examples within the scope of the technical ideas as set forth in claims, and it should be understood that such examples belong to the technical scope of the present invention as a matter of course.

What is claimed is:

1. A pre-painted metal sheet comprising:
a metal sheet; and
a void-containing paint film, which is a paint film located on at least one surface of the metal sheet, with dispersed fine particles and voids, wherein
when a cross-section of the void-containing paint film cut in a thickness direction of the void-containing paint film is observed, the voids are present in 40 to 95 area % of a total area of the cross-section of the void-containing paint film,
when an average particle diameter of the fine particles is t [μm] and an average film thickness of the void-containing paint film is T [μm], a ratio t/T is in a range of 0.7 to 3.0, and
an elastic modulus of the fine particles at a 10% compression from the thickness direction of the void-containing paint film is 30 MPa or more.

2. The pre-painted metal sheet according to claim 1, wherein
the average film thickness of the void-containing paint film is larger than an average diameter of the voids.

3. The pre-painted metal sheet according to claim 1, wherein
when the average diameter of the voids is dv [μm], the average film thickness T of the void-containing paint film and the average diameter dv of the voids satisfy a relationship expressed by the following inequality (1), $$T \geq 1.1 dv \quad (1).$$

4. The pre-painted metal sheet according to claim 1, wherein
when a presence ratio of the voids in the void-containing paint film relative to the total area of the cross-section is Pv [area %], the presence ratio Pv [area %] of the voids, the average particle diameter t of the fine particles, the average film thickness T, and a predetermined measurement width W satisfy a relationship expressed by the following inequality (2), $$(t^2/8)\pi/(W \cdot T) \leq Pv \leq 10 t^2 \pi/(W \cdot T) \quad (2).$$

5. The pre-painted metal sheet according to claim 1, wherein
the average film thickness T of the void-containing paint film is in a range of 50 to 1000 μm.

6. The pre-painted metal sheet according to claim 1, wherein
a second paint film that does not contain voids and has an average film thickness of 0.5 to 20.0 μm is present on an upper layer of the void-containing paint film.

7. The pre-painted metal sheet according to claim 1, wherein
the fine particles are at least either one of polyacrylonitrile or vinylbenzene polymer.

8. The pre-painted metal sheet according to claim 1, wherein
a content of the fine particles is in a range of 1 to 40 area % of the total area of the cross-section of the void-containing paint film when cut in the thickness direction of the void-containing paint film.

9. The pre-painted metal sheet according to claim 1, wherein
the metal sheet is any of a galvanized steel sheet, a zinc-aluminum alloy-plated steel sheet, a zinc-aluminum-magnesium alloy-plated steel sheet, an aluminum plated steel sheet, a zinc-nickel alloy-plated steel sheet, a zinc-iron alloy-plated steel sheet, a copper sheet, a magnesium sheet, an aluminum sheet, or a stainless sheet.

10. The pre-painted metal sheet according to claim 1, wherein
an emissivity of a surface of the metal sheet opposite the void-containing paint film is 0.30 or less.

11. A burn-prevention cover, which is a cover formed by the pre-painted metal sheet according to claim 1, wherein
a heat source is used to be located on an opposite side of the void-containing paint film.

12. A manufacturing method of a pre-painted metal sheet having a void-containing paint film, which is a paint film with dispersed fine particles and voids, on at least one surface of a metal sheet, the manufacturing method comprising:
forming the void-containing paint film by drying and curing a first paint, the curing including coating the first paint, which contains the fine particles, a resin, a curing agent, hollow microcapsules, and a solvent, on at least one surface of the metal sheet and heating the metal sheet coated with the first paint, wherein
the hollow microcapsules contain an organic solvent and a content of the hollow microcapsules in the first paint is in a range of 5 to 50 mass % of a solid content mass of the first paint, and
when an average particle diameter of the fine particles is t [μm] and an average film thickness of the void-containing paint film after drying and curing is T [μm], the first paint is coated so that a ratio t/T is in a range of 0.7 to 3.0.

13. The manufacturing method of the pre-painted metal sheet according to claim 12, wherein
an average paint film thickness of the first paint is larger than an average diameter of the hollow microcapsules.

14. The manufacturing method of the pre-painted metal sheet according to claim 12, wherein
the average paint film thickness of the first paint is 1.1 times or more the average diameter of the hollow microcapsules.

15. The manufacturing method of the pre-painted metal sheet according to claim 12, wherein
the first paint is cured at a temperature in a range of 150 to 250° C., and the hollow microcapsules containing the organic solvent are foamed, wherein the hollow microcapsules are foamed at a temperature in a range of 130 to 190° C.

16. The manufacturing method of the pre-painted metal sheet according to claim 12, wherein
curing and drying the first paint comprises heating the metal sheet coated with the first paint at a heating rate of 70 to 750° C./min to reach a peak metal temperature of 200 to 250° C., holding the peak metal temperature for 0.5 to 10 s, and then cooling the metal sheet to 60° C. or less at a cooling rate of 3 to 230° C./min.

17. The manufacturing method of the pre-painted metal sheet according to claim 12, wherein
the fine particles are at least either one of polyacrylonitrile or vinylbenzene polymer.

18. The manufacturing method of the pre-painted metal sheet according to claim 12, wherein
a multilayer curtain film is formed by the first paint and a second paint and the multilayer curtain film is coated on a surface of the metal sheet, wherein the second paint does not contain hollow microcapsules.

\* \* \* \* \*